United States Patent
Ki

(10) Patent No.: US 9,469,885 B2
(45) Date of Patent: Oct. 18, 2016

(54) METHOD FOR RECOVERING VALUABLE METALS FROM SLAG AND APPARATUS FOR MANUFACTURING MULTIFUNCTIONAL AGGREGATE

(71) Applicant: Hyundai Steel Company, Incheon (KR)

(72) Inventor: Joon-Seong Ki, Incheon (KR)

(73) Assignee: Hyundai Steel Company, Incheon (KR)

( * ) Notice: Subject to any disclaimer, the term of this patent is extended or adjusted under 35 U.S.C. 154(b) by 218 days.

(21) Appl. No.: 14/096,956

(22) Filed: Dec. 4, 2013

(65) Prior Publication Data
US 2014/0091503 A1    Apr. 3, 2014

Related U.S. Application Data

(63) Continuation of application No. PCT/KR2012/007639, filed on Sep. 24, 2012.

(30) Foreign Application Priority Data

Nov. 29, 2011    (KR) .......................... 10-2011-0126378

(51) Int. Cl.
*C22B 5/00*    (2006.01)
*C22B 7/04*    (2006.01)
(Continued)

(52) U.S. Cl.
CPC .................. *C22B 7/04* (2013.01); *C04B 5/065* (2013.01); *C04B 18/141* (2013.01); *Y02P 10/212* (2015.11); *Y02W 30/94* (2015.05)

(58) Field of Classification Search
CPC ........... C22B 7/04; C22B 5/02; C04B 5/065; C04B 18/141; Y02W 30/54; Y02W 30/94; Y02W 30/543; C21B 3/08; C21B 3/10; B22F 2009/086; Y02P 10/212
USPC ........... 266/81, 168, 99, 201, 227; 75/10.35, 75/10.59, 10.6, 414; 241/18, 23
See application file for complete search history.

(56) References Cited

U.S. PATENT DOCUMENTS 2,590,901 A * 4/1952 Stout ......................... C21B 3/06
501/39

(Continued)

FOREIGN PATENT DOCUMENTS

CN    101086038 A    12/2007
JP    63-140044    6/1988
(Continued)

OTHER PUBLICATIONS

Chinese Office Action for Chinese Patent Application No. 201280029164.6, dated Jul. 3, 2013.
(Continued)

*Primary Examiner* — Scott Kastler
*Assistant Examiner* — Michael Aboagye
(74) *Attorney, Agent, or Firm* — Mintz Levin Cohn Ferris Glovsky and Popeo, P.C.; Kongsik Kim; Carolina Säve

(57) ABSTRACT

An apparatus for recovering valuable metals and manufacturing multifunctional aggregate from slag. The apparatus includes a slag reforming processing pot 10 in which molten slag discharged from a converter or an electric furnace is stored, a reducing agent introducing part 20 which introduces a reducing agent into the slag reforming processing pot from above, the reducing agent recovering valuable metals from the molten slag, a reducing agent inflow part 25 which inputs a reducing agent into the slag reforming processing pot through a lower portion of a side of the slag reforming processing pot, the reducing agent recovering valuable metals from the molten slag, and cooling units 30 and 40 which create bubbles and perform controlled cooling in order to convert the molten slag, from which the valuable metals are recovered, into a light material having a porous structure.

8 Claims, 9 Drawing Sheets

(51) Int. Cl.
    *C04B 5/06*     (2006.01)
    *C04B 18/14*     (2006.01)

(56) References Cited

U.S. PATENT DOCUMENTS

| | | | | |
|---|---|---|---|---|
| 3,203,776 | A * | 8/1965 | Rodis | C21B 3/06 501/84 |
| 4,110,107 | A * | 8/1978 | Paulson | C21B 3/04 75/10.35 |
| 9,139,889 | B2 * | 9/2015 | Ki | C22B 7/04 |
| 2011/0289845 | A1 * | 12/2011 | Davis | C01B 3/348 48/197 R |
| 2012/0073406 | A1 * | 3/2012 | Ki | C04B 5/06 75/414 |

FOREIGN PATENT DOCUMENTS

| | | |
|---|---|---|
| JP | 01-275711 | 11/1989 |
| JP | H01275711 A | 11/1989 |
| JP | 08-323329 | 12/1996 |
| JP | 2003-254528 A | 9/2003 |
| JP | 2006-328519 A | 12/2006 |
| KR | 20-1992-0000533 Y1 | 1/1992 |
| KR | 10-2001-0097921 A | 11/2001 |
| KR | 2001-0097921 | 11/2001 |
| KR | 20-0282921 Y1 | 10/2002 |
| KR | 10-2011-0088065 A | 8/2011 |
| KR | 10-2011-0088082 A | 8/2011 |

OTHER PUBLICATIONS

Supplementary European Search Report issued on Jun. 1, 2015 in corresponding European Patent Application No. 12854095.2.

* cited by examiner

METHOD FOR RECOVERING VALUABLE METALS FROM SLAG AND APPARATUS FOR MANUFACTURING MULTIFUNCTIONAL AGGREGATE

CROSS-REFERENCES TO RELATED APPLICATIONS

This is a continuation of International Application No. PCT/KR2012/007639, filed on Sep. 24, 2012, which claims priority to Korean Application No.: 10-2011-0126378 filed on Nov. 29, 2011, which applications are incorporated herein by reference.

TECHNICAL FIELD

The present invention relates, in general, to an apparatus for recovering valuable metals and manufacturing multifunctional aggregate from slag and, more particularly, to an apparatus for recovering valuable metals and manufacturing multifunctional aggregate from slag which is produced in a steelmaking process using a converter, an electric furnace, or the like.

The present application claims the benefit of Korean Patent Application No. 10-2011-0126378, filed on Nov. 29, 2011, the entire contents of which are incorporated herein by reference.

BACKGROUND ART

Slag is a product that is inevitably produced from a smelting process. The slag is inevitably produced from the gangue component of iron ores or cokes in an ironmaking process. In the steelmaking process, the slag is inevitably produced from an oxide produced during oxidation or deoxidation of molten iron or molten steel or subsidiary materials added for the purpose of refining.

DISCLOSURE

Technical Problem

Accordingly, the present invention provides an apparatus for recovering valuable metals and manufacturing multifunctional aggregate from slag which can recover valuable metals (Fe, Mn) from steelmaking molten slag and reform the slag in order to utilize the resultant slag for cement, an admixture material and a specific use material.

Technical Solution

In order to accomplish the above object, the present invention provides an apparatus for recovering valuable metals and manufacturing multifunctional aggregate from slag that includes: a slag reforming processing pot in which molten slag discharged from a converter or an electric furnace is stored; a reducing agent introducing part which introduces a reducing agent into the slag reforming processing pot from above, the reducing agent recovering valuable metals from the molten slag; a reducing agent inflow part which inputs a reducing agent into the slag reforming processing pot through a lower portion of a side of the slag reforming processing pot, the reducing agent recovering valuable metals from the molten slag; and a cooling unit which creates bubbles and perform controlled cooling in order to convert the molten slag, from which the valuable metals are recovered, into a light material having a porous structure The reducing agent introducing part may include a hopper in which the reducing agent is stored, a lance pipe which extends from the hopper into the slag reforming processing pot in order to inject the reducing agent into the slag reforming processing pot, and an inflow control part which calculates an amount of the reducing agent that is introduced into the slag reforming processing pot through the lance pipe.

The reducing agent inflow part may include an injection pipe which is disposed at a lower portion of the side of the slag reforming processing pot, the injection pipe introducing a reducing agent and a gas into the slag reforming processing pot, a supply pipe which is connected to one portion of the injection pipe, the supply pipe supplying a reducing agent and a gas to the injection pipe, and a hole opener which is disposed at the injection pipe, the hole opener opening an outlet of the injection pipe when the outlet is closed.

The hole opener may include a body which is disposed at one end of the injection pipe that is opposite the outlet, the body having defined therein a space that hydraulic or pneumatic pressure enters and exits, and a hole-opening part which is to be opened or closed inside the body in a direction toward the outlet of the injection pipe, a part of the outer circumference of the leading end of the hole-opening part corresponding to an inner diameter of the injection pipe.

The hole-opening part may have a conical leading end.

A reducing agent sensor and an opener control may be provided. The reducing agent sensor detects that the outlet of the injection pipe is closed based on whether or not the reducing agent flows inside the injection pipe. The opener control receives a detection signal from the reducing agent sensor, and opens the outlet of the injection pipe by operating the hole opener if it is determined that the outlet of the injection pipe is closed.

The supply pipe may be connected to a reducing agent supply pipe connected to the hopper in which the reducing agent is stored and a gas supply pipe. The supplied reducing agent and the gas are mixed before being supplied to the injection pipe under control.

The reducing agent supply pipe and the gas supply pipe may be provided with injection valves which adjust amounts of the reducing agent and the gas that are supplied.

The cooling unit may include a steam supplying part which introduces steam into the slag reforming processing pot, the steam cooling the molten slag to produce the solid slag, and a gas supplying part which introduces a carrier gas into the slag reforming processing pot, the carrier gas maximizing a reaction between the molten slag and the reducing agent. The controlled cooling is performed as a mixture gas including the steam and the carrier gas is blown into the molten slag.

Advantageous Effects

According to the present invention, valuable metals (Fe, Mn) can be recovered from slag discharged from a converter or an electric furnace. The slag can be converted into slag having a low specific weight through forming and controlled cooling, and multifunctional aggregate can be manufactured from the slag having a low specific weight. The composition of the multifunctional aggregate is similar to that of natural aggregate, cement or the like and the multifunctional aggregate expands little. Accordingly, the multifunctional aggregate can reliably substitute multifunctional light-weight aggregate that is manufactured for special uses, such as a material for preventing noise between floors in a building. It is possible to suitably manufacture cement from the multifunctional aggregate by modifying the composition of the multifunctional aggregate according to the composition of cement.

In particular, since a reducing agent is input into the slag reforming processing pot through the reducing agent introducing part and the reducing agent inflow part, the stirring force of the reducing agent is increased. Thus, the reducing agent is sufficiently reduced and is uniformly distributed inside the slag, thereby further improving the reduction efficiency. The improved reduction efficiency not only increases the recovery rate of valuable metals but also is cost efficient.

In addition, the injection pipe of the reducing agent inflow part is provided with the hole opener. When the portion when the slag reforming processing pot and the injection pipe are connected is closed, the closed portion can be easily opened. This causes the reducing agent to be efficiently input, thereby sufficiently contributing to an improvement in the stirring force of the reducing agent.

Figure 1:
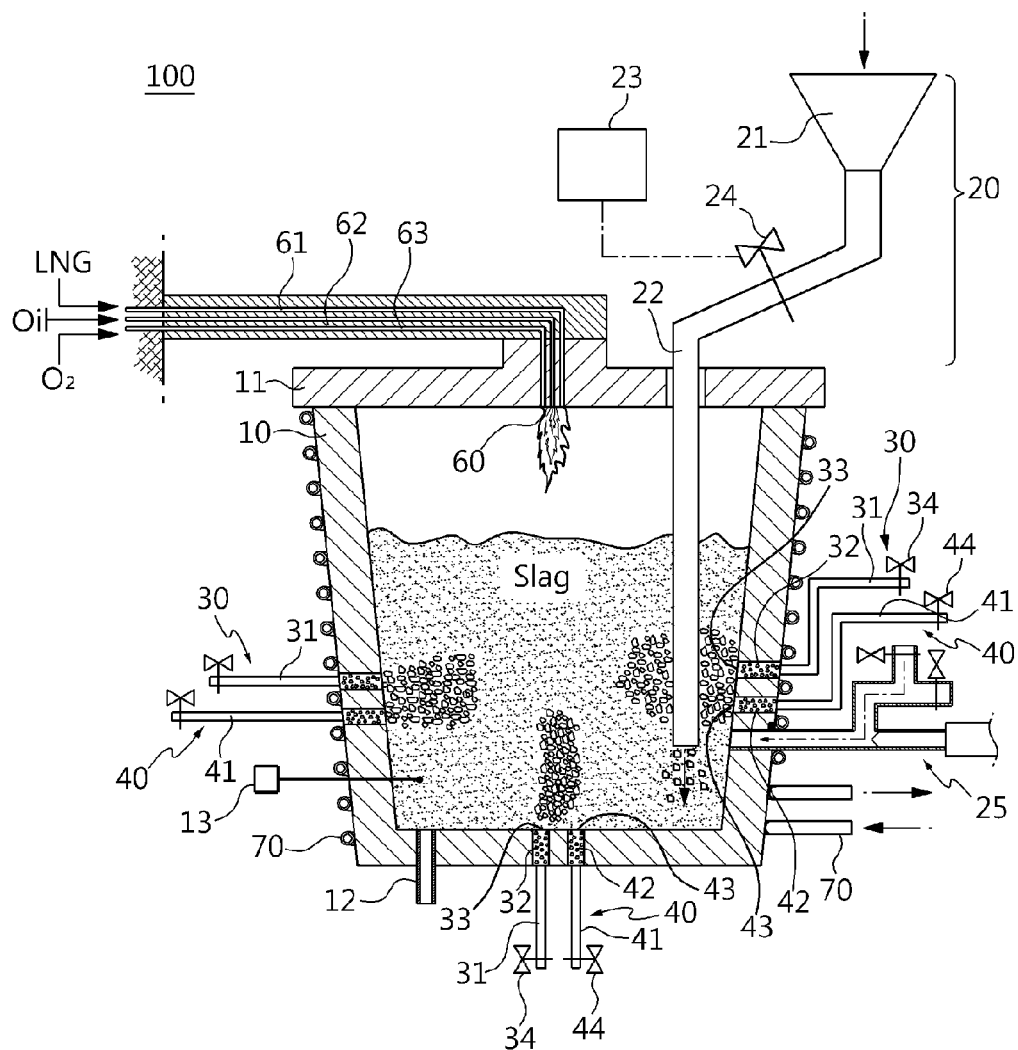
FIG. 1 is a configuration view showing an apparatus for recovering valuable metals and manufacturing multifunctional aggregate from slag according to an embodiment of the present invention.

<Description of the Reference Numerals in the Drawings>

10: slag reforming processing pot
25: reducing agent inflow part
26a: hole opener
26c: hole-opening part
28: reducing agent supply pipe
28a, 29a: injection valve
C: hole opener control
40: gas supplying part
70: water cooling line
90: recovery unit
100: apparatus for recovering valuable metals and manufacturing multifunctional aggregate from slag
20: reducing agent introducing part
26: injection pipe
26b: body
27: supply pipe
29: gas supply pipe
S: reducing agent sensor
30: steam supplying part
60: burner
80: weld preventing part

BEST MODE

Reference will now be made in greater detail to exemplary embodiments of the present invention in conjunction with the accompanying drawings.

The present invention recovers valuable metals and multifunctional aggregate using an apparatus 100 for recovering valuable metals and manufacturing multifunctional aggregate from slag shown in FIG. 1.

A method of manufacturing multifunctional aggregate includes discharging molten slurry from a converter or an electric furnace into a slag reforming processing pot 10 before the operation of a reducing apparatus and recovering valuable metals from the molten slag by introducing a reducing agent thereto.

Afterwards, in order to form a light material having a porous structure from the molten slag from which the valuable metals are recovered, bubbles are created in the molten slag from which the valuable metals are recovered, followed by controlled cooling, thereby forming a solid slag having a porous structure. The solid slag having a porous structure is crushed and ground, and the resultant material is shaped into aggregate. The resultant multifunctional aggregate can be used for high-quality cement, light aggregate or an admixture since the composition thereof is similar to that of natural aggregate or cement. In particular, the multifunctional aggregate can be used for special aggregate having multiple uses due to low specific weight and low hygroscopicity.

This process of recovering valuable metals and manufacturing multifunctional aggregate will be referred to as "Ki-Hwang (KH) process."

The chemical composition of a steelmaking slag analyzed during a steelmaking process using an electric furnace is presented in Table 1.

TABLE 1

| | (unit: wt %) | | | | | | | | |
|---|---|---|---|---|---|---|---|---|---|
| Section | $SiO_2$ | $AL_2O_3$ | T•Fe | CaO | MgO | MnO | $P_2O_5$ | T/S | $CaO/SiO_2$ |
| Electric furnace melt down | 18.30 | 11.11 | 22.36 | 20.12 | 8.41 | 5.81 | 0.241 | 0.123 | 1.11 |

TABLE 1-continued (unit: wt %)

| Section | SiO$_2$ | AL$_2$O$_3$ | T•Fe | CaO | MgO | MnO | P$_2$O$_5$ | T/S | CaO/SiO$_2$ |
|---|---|---|---|---|---|---|---|---|---|
| Last stage of oxidation refining in electric furnace | 19.29 | 11.39 | 19.02 | 22.12 | 8.61 | 6.28 | 0.213 | 0.100 | 1.14 |
| LF arrival | 26.59 | 8.03 | 1.88 | 37.95 | 16.18 | 4.64 | 0.033 | 0.332 | 1.44 |
| LF tapping | 26.44 | 6.92 | 0.58 | 48.05 | 13.18 | 0.84 | 0.024 | 0.785 | 1.83 |

A steelmaking slag produced from a converter or an electric furnace contains at least 20% of valuable metal oxides. In particular, an initial slag produced from the electric furnace contains at least 30% of valuable metal oxides.

Representative of valuable metal oxides contained in the slag is FeO. When the content of FeO is high, crushing is difficult when manufacturing the slag into aggregate, and there are great constraints when using the aggregate as a raw material for cement. Therefore, after the valuable metals are recovered from the slag, the shape of the remaining slag is converted into a light material having a porous structure through controlled cooling.

The apparatus 100 for recovering valuable metals and manufacturing multifunctional aggregate from slag includes the slag reforming processing pot 10, a reducing agent introducing part 20, a reducing agent inflow part 25 and cooling units 30 and 40.

Discharge of slag from an electric furnace is performed after oxidation refining before reduction refining, i.e. after the middle stage of the oxidation refining. At the last stage of the oxidation refining, it is difficult to discharge the slag since the fluidity of the slag decreases due to the reduced amount of metal oxides in the slag. Therefore, it is important to select the timing of the discharge of the slag.

The slag is first discharged into a separate slag pot (not shown) by inclining the electric furnace or opening a door if any, and then the molten slag is loaded into the slag reforming processing pot 10.

In addition, it is also possible to directly discharge the slag from the electric furnace into the slag reforming processing pot 10.

The inside wall of the slag reforming processing pot 10 is made of a copper or iron plate having high thermal conductivity. The slag reforming processing pot 10 has a pot cover 11 on the upper portion thereof which opens or closes the upper portion of the slag reforming processing pot 10 so that the molten slag discharged from the converter or electric furnace is introduced into the slag reforming processing pot 10.

When the molten slag discharged from the converter or electric furnace is stored in the slag reforming processing pot 10, a reducing agent for recovering valuable metals from the molten slag is introduced into the slag reforming processing pot 10 using the reducing agent introducing part 20.

The reducing agent introducing part 20 includes a hopper 21 in which the reducing agent is stored, a lance pipe 22 which extends from the hopper 21 into the slag reforming processing pot 10 in order to inject the reducing agent into the slag reforming processing pot 10, and an inflow control part 23 which calculates the amount of the reducing agent that is introduced into the slag reforming processing pot 10 through the lance pipe 22.

The reducing agent inflow part 25 is also provided in order to increase the stirring force of the reducing agent.

Figure 2:
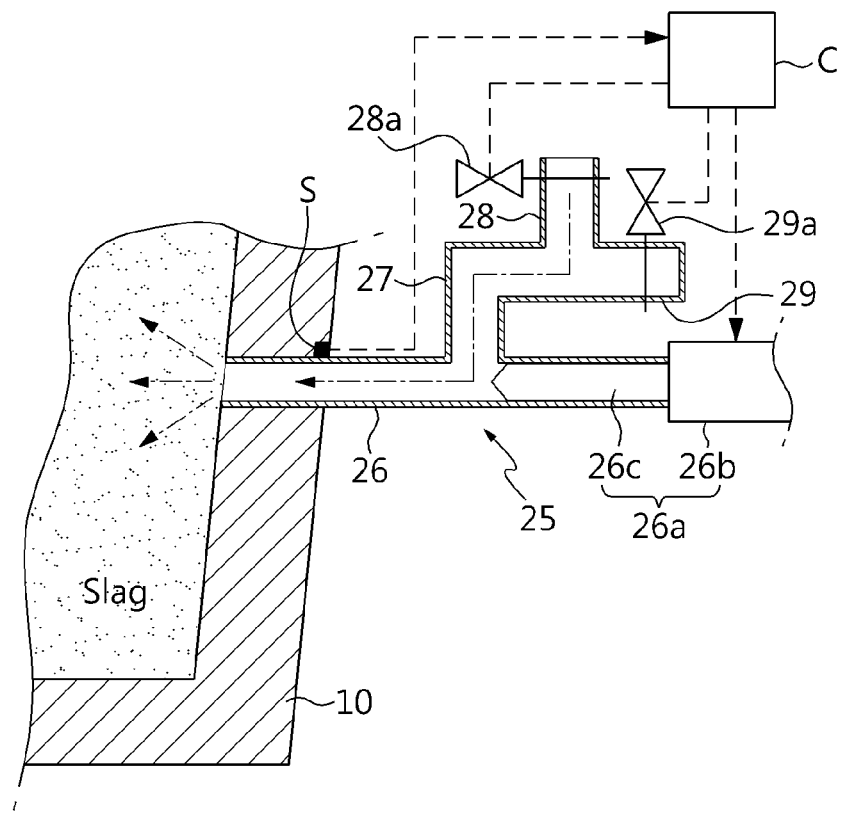
FIG. 2 is a view showing the reducing agent inflow part according to an embodiment of the present invention.

As shown in FIG. 2, the reducing agent inflow part 25 includes an injection pipe 26, a supply pipe 27 and a hole opener 26a. The injection pipe 26 is disposed at the lower portion of the side of the slag reforming processing pot 10, and introduces a reducing agent and a gas into the slag reforming processing pot 10. The supply pipe 27 is connected to one portion of the injection pipe 26, and supplies a reducing agent and a gas to the injection pipe 26. The hole opener 26a is disposed at the injection pipe 26, and opens the outlet of the injection pipe 26 when the outlet is closed.

When the reducing agent having particles is input concurrently with the gas into the slag reforming processing pot 10 through the lower portion of the side, the stirring force of the reducing agent is increased so that the reducing agent is sufficiently stirred. The reducing agent is then uniformly distributed into the slag, thereby further improving the reduction efficiency.

The supply pipe 27 is connected to a reducing agent supply pipe 28 connected to the hopper 21 in which the reducing agent is stored and a gas supply pipe 29. The supplied reducing agent and gas are mixed in the supply pipe 27, and supplied to the injection pipe 26 under control.

When the reducing agent is supplied concurrently with the gas to the injection pipe 26, the reducing agent is easily blown in the gas into the slag reforming processing pot 10. The gas is supplied under high pressure in order to facilitate the injection of the reducing agent having particles.

Injection valves 28a and 29a which adjust the amount of the reducing agent and the amount of gas are disposed on the reducing agent supply pipe 28 and the gas supply pipe 29. The opening or closing of the injection valves 28a and 29a can be adjusted under the control of a hole opener control C which will be described later.

The hole opener 26a includes a body 26b and a hole-opening part 26c. The body 26b is disposed at one end of the injection pipe 26 that is opposite the outlet, and has defined therein a space that hydraulic or pneumatic pressure enters and exits. The hole-opening part 26c can be opened or closed inside the body 26b in the direction toward the outlet of the injection pipe 26, and a part of the outer circumference of the leading end thereof corresponds to the inner diameter of the injection pipe 26.

The outlet of the injection pipe 26 communicates with the slag reforming processing pot 10 such that the reducing agent and gas supplied to the injection pipe 26 can be easily blown into the slag reforming processing pot 10.

The outlet portion of the injection pipe 26 can be closed by the slag that is solidified. In this case, an improvement in the reduction efficiency is rarely expected since the reducing agent is not blown into the slag reforming processing pot 10. Then, the solidified slag layer is opened using the hole opener 26a, so that the reducing agent can be easily blown.

When the outlet portion of the injection pipe 26 is not closed, the hole opener 26a is moved to the portion of the injection pipe that is opposite the outlet so that the supply pipe 27 and the injection pipe 26 communicate with each other. When the outlet portion of the injection pipe 26 is closed, the hole opener 26a is moved to the outlet portion of the injection pipe 26 in order to open the outlet of the injection pipe 26.

At this time, the hole opener 26c closes the portion when the supply pipe 27 which supplies the reducing agent and gas to the injection pipe 26 is connected to the injection pipe, thereby blocking the supply of the reducing agent and gas to the injection pipe 26.

The hole-opening part 26c has a conical leading end such that the hole-opening part can easily open the solidified slag layer that closes the outlet of the injection pipe 26. In addition, the leading end of the hole-opening part 26c may have a spiral shape as long as it can easily open the solidified slag layer.

Provided are a reducing agent sensor S and the hole opener control C. The reducing agent sensor S detects that the outlet of the injection pipe 26 is closed based on whether or not the reducing agent flows inside the injection pipe 26. The opener control C receives a detection signal from the reducing agent sensor S, and if it is determined that the outlet of the injection pipe 26 is closed, opens the outlet of the injection pipe 26 by operating the hole opener 26a.

The reducing agent detector S detects whether or not the reducing agent and gas flows to the outlet of the injection pipe 26. The opener control C receives the detection signal from the reducing agent sensor S, and if it is determined that the reducing agent and gas do not flow to the outlet portion of the injection pipe 26, determines that the outlet portion of the injection pipe 26 is closed.

Figure 3:
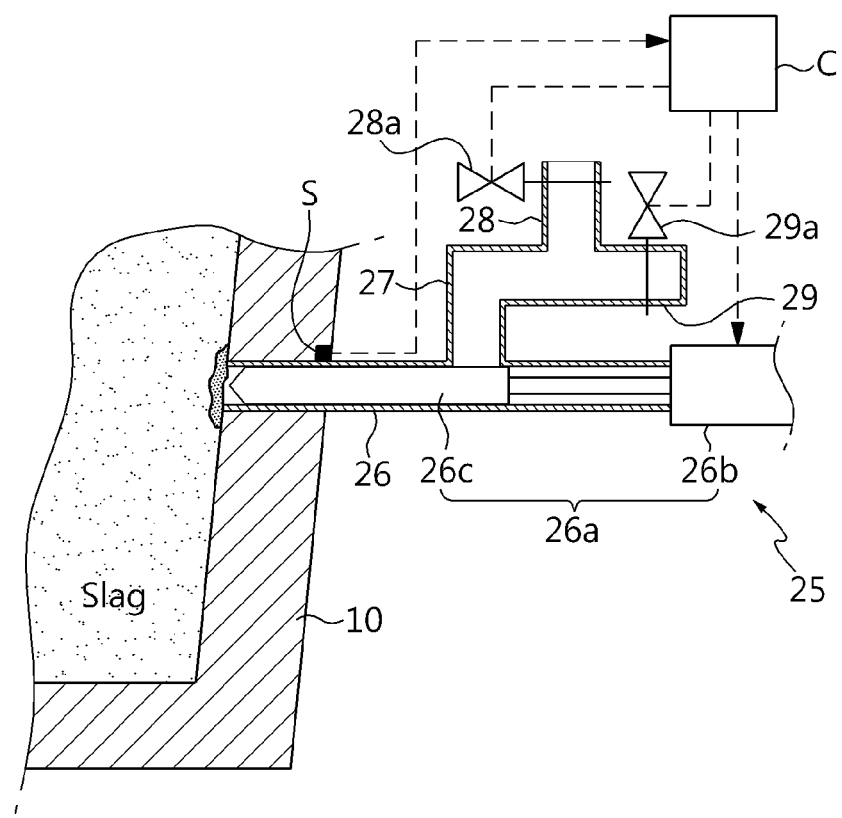
FIG. 3 and FIG. 4 are process views showing the state of use of the reducing agent inflow part according to an embodiment of the present invention.
Figure 4:
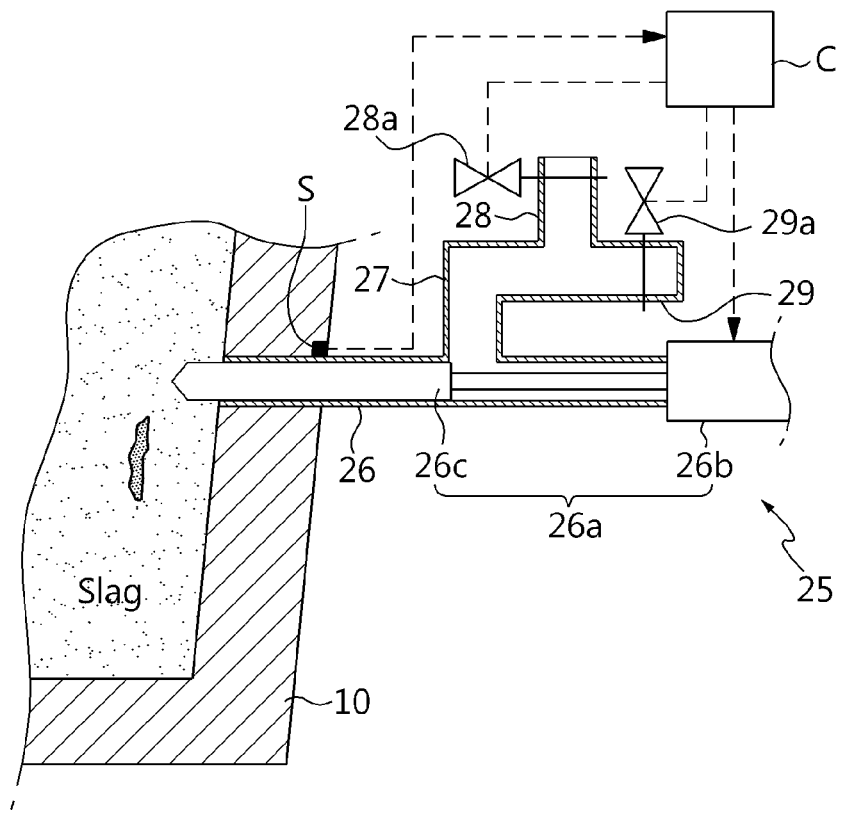

Then, as shown in FIG. 3 and FIG. 4, hydraulic or pneumatic pressure is supplied to the body 26b so that the hole-opening part 26c proceeds. The hole-opening part 26c then opens the solidified slag layer, thereby opening the outlet of the injection pipe 26.

At this time, the opener control C can stop the supply of the reducing agent and gas into the injection pipe 26 by closing the injection valves 28a and 29a which adjust the amount of the reducing agent and gas while operating the hole opener 26a.

Reference will now be made to the process of blowing the reducing agent into the molten slag discharged into the slag reforming processing pot 10.

The reducing agent is intended to reduce valuable metal oxides, in particular, FeO, in the molten slag into Fe. The reducing agent is implemented as a substance that has strong oxygen affinity, such as carbon (C) or aluminum (Al). In addition, at least one selected from among silicon (Si), sodium (Na), calcium (Ca), magnesium (Mg) and CO gas can be used.

At least one reducing agent selected from among carbon (C), aluminum (Al), silicon (Si), sodium (Na), calcium (Ca), magnesium (Mg) and CO gas is supplied to the slag reforming processing pot 10 through the reducing agent introducing part 20 in the upper portion and the reducing agent inflow part 25 in the lower portion of the side.

Here, a earner gas can also be introduced together with the reducing agent in order to accelerate the reaction by increasing the stirring force. The earner gas can be air, nitrogen gas or argon gas, and is supplied to the slag reforming processing pot 10 through a gas supplying part 40 which will be described later.

In the case where the reducing agent is supplied into the slag reforming processing pot 10 through the reducing agent inflow part 25, it is also possible to concurrently blow high-pressure air, nitrogen gas or argon gas so that the reducing agent can be easily blown in the reducing agent into the slag reforming processing pot 10.

Here, the high-pressure gas supplied into the slag reforming processing pot 10 concurrently with the reducing agent serves to promote the distribution of the reducing agent into the slag and increase the stirring force of the reducing agent.

In the reducing agent, aluminum (Al) is introduced for strong reduction of iron (Fe).

The reduction of iron (Fe) contained in the molten slag is more advantageous as the temperature of the molten slag is higher and the reaction rate is higher. However, the reduction reaction of iron (Fe) by carbon (C) is an endothermic reaction, thereby lowering the temperature of the molten slag.

The temperature of the molten slag is about 1600° C. when discharged. However, after being discharged, the temperature of the molten slag is decreased by about 200 to 300° C. per hour due to the reduction reaction of iron (Fe) by carbon (C) and external factors.

Although a separate heat source for maintaining the molten slag at high temperature is required, aluminum (Al) oxidation energy is created when aluminum (Al) is used as the reducing agent. The reduction reaction of iron (Fe) by carbon (C) is an endothermic reaction expressed by the formula: $3FeO+2Al \rightarrow 3Fe+Al_2O_3-187.1$ kcal. The reaction is also referred to as the Thermit reaction since this reaction generates heat due to reduction.

The amount of aluminum (Al) that is introduced is controlled to the range in which the temperature is maintained from 1300 to 1600° C. The higher the temperature of the molten slag is, the more advantageous the reduction of iron (Fe) is. However, when the temperature of the molten slag exceeds 1600° C., the slag pot may be excessively eroded. When temperature of the molten slag is below 1300° C., the reduction reaction is significantly reduced.

Referring to the process in detail, when the molten slag is discharged into the slag pot from the electric furnace, carbon (C) acts as a reducing agent in a reduction reaction expressed by: $FeO+C \rightarrow Fe+CO$.

In this process, the temperature of the molten slag may be lowered. Afterwards, however, when aluminum (Al) is added, the reduction reaction is promoted since the temperature of the molten slag is maintained at high temperature through an endothermic reaction expressed by the formula: $3FeO+2Al \rightarrow 3Fe+Al_2O_3-187.1$ kcal. Here, $Al_2O_3$ produced through the reduction reaction causes a variation in the composition of the slag and lowers the melting point of the slag.

The amount of aluminum (Al) added to maintain the temperature of the molten slag in the range from 1300 to 1600° C. is 10 to 50 kg per 1 ton of slag. The amount of aluminum (Al) added is a value obtained by setting an actual yield of aluminum (Al) to the range from 50 to 100% depending on the operating condition.

The amount of aluminum (Al) added is calculated by the following reaction formula and calorie amount.

Reaction Formula: $3FeO+2Al \rightarrow 3Fe+Al_2O_3-187.1$ kcal

Calorie Amount: $Q=CMT$

Here, Q is a calorie amount, C is heat capacity, M is a weight of the slag, and T is an increased temperature.

For instance, provided the weight of the slag be 10 ton and the content of FeO in the slag be 1 ton, the amount of aluminum (Al) added is 251 kg.

The calculation process is as follows.

The amount of Al that reacts with FeO 1 mole is ⅔ mole.

FeO 1 mole=71.8 g

FeO 1 ton=1000000/71.8=13928 moles

The amount of Al that reacts with FeO 13928 moles is 9285 moles.

Al 9285 moles→9285 moles X 27 g/mole=251 kg

The content of FeO in the molten slag can be measured using a spectrometer, or in a wet metering method or the like.

As described above, the amount of aluminum (Al) added to maintain the temperature of the molten slag in the range from 1300 to 1600° C. is 10 to 50 kg per 1 ton of slag. In order to introduce the amount of the reducing agent in this suitable range, the inflow control part 23 calculates the amount of the reducing agent with which the temperature of the molten slag can be maintained in the range from 1300 to 1600° C.

For this, the inflow control part 23 calculates the amount of the reducing agent with which the temperature of the molten slag can be maintained in the range from 1300 to 1600° C. from the weight of the molten slag measured using a weight measuring device (not shown; disposed to support the bottom of the slag reforming processing pot) which measures the weight of the molten slag in the slag reforming processing pot 10.

The weight measuring device can be implemented as an electronic balance including a load cell. In addition, any types of balances that are used to measure weight can be applied.

For instance, when the weight of the molten slag measured using the weight measuring device is 1 ton, the inflow control part 23 calculates the added amount of aluminum (Al), the reducing agent, to be from 10 to 50 kg. Then, the inflow control part 23 adjusts a control valve 24 and the injection valves 28a and 29a on the pipes so that the calculated amount of the reducing agent (Al) is introduced from the hopper 21 into the slag reforming processing pot 10 through the lance pipe 22 and the injection pipe 26.

In the meantime, an inoculation agent that reduces the melting point and the specific weight of the molten slag and reforms the slag can be further introduced through the reducing agent introducing part 20.

Before controlled cooling, the inoculation agent that reduces the melting point and the specific weight of the molten slag and reforms the slag can be introduced. The inoculation agent causes a change in the physical/chemical composition of the molten slag in order to reduce the melting point and specific weight by inducing forming of the molten slag having a temperature of 1300° C. or above.

The molten slag satisfies a specific weight of 3.0 g/cm$^3$ or less. Here, the specific weight of the molten slag is reduced due to a complex action of the input of the inoculation agent and the recovery of FeO to Fe.

Referring to the principle, when the inoculation agent is introduced, low melting point oxides are produced through an oxidation reaction, and the specific weight of the molten slag is reduced as the volume of the slag is expanded while being cooled by steam and a carrier gas. In addition, the melting point of the slag is also lowered by the low melting point oxides.

Here, the inoculation agent may be one selected from among aluminum, silicon, quicklime or the like.

Aluminum, silicon, quicklime or the like is introduced at an amount of 400 kg per 1 ton of slag or less. An increase in the amount of aluminum or silicon added acts to lower the specific weight and the melting point of the molten slag. However, when an excessive amount of aluminum or silicon is added, the molten slag is deprived of heat before the reaction. Accordingly, the amount of aluminum or silicon must not exceed 400 kg per 1 ton of slag because the reaction for lowering the melting point and specific weight is possible only when the slag is in the molten state.

The apparatus 100 for recovering valuable metals and manufacturing multifunctional aggregate further includes a burner 60 disposed at the pot cover 11. The burner 60 maintains or raises the temperature of the molten slag in order to facilitate the reaction between the molten slag and the reducing agent or the inoculation agent. The burner 60 can maintain the reactivity of the molten slag to the reducing agent or the inoculation agent at a preset level by maintaining the temperature of the molten slag at a uniform value.

Here, the burner 60 uses liquefied natural gas (LNG) and oil as fuel and oxygen. The apparatus 100 for recovering valuable metals and manufacturing multifunctional aggregate according to the present invention further includes fuel supply pipes 61, 62 and 63 which extend through the pot cover 11 in order to supply LNG, oil and oxygen into the slag reforming processing pot 10. Referring to FIG. 1, reference numeral 61 is an LNG supply pipe, reference numeral 62 is an oil supply pipe, and reference numeral 63 is an oxygen supply pipe.

The reduction is completed in 1 to 2 hours after aluminum (Al) is introduced.

Upon completion of the reduction, iron (Fe) having a higher specific weight is separated to the lower portion of the slag reforming processing pot 10 and the molten slag is positioned thereover.

Before the controlled cooling is performed after completion of the reduction, the valuable metals (Fe) that have been recovered from the molten slag and separated to the slag reforming processing pot 10 are required to be discharged from the slag reforming processing pot 10 in order to increase the efficiency of the controlled cooling and convert the molten slag into a solid slag having a porous structure. This is performed through a discharge port 12 formed in the slag reforming processing pot 10. As shown in FIG. 1, the discharge port 12 can be formed in the lower portion of the slag reforming processing pot 10.

The cooling units 30 and 40 according to the present invention perform the controlled cooling of the molten slag inside the slag reforming processing pot 10 in order to convert the molten slag from which the valuable metals are recovered into a light material having a porous structure.

The cooling units 30 and 40 include a steam supplying part 30 and a gas supplying part 40. The steam supplying part 30 introduces steam into the slag reforming processing pot 10, the steam cooling the molten slag to produce the solid slag. The gas supplying part 40 introduces a carrier gas into the slag reforming processing pot 10, the carrier gas maximizing the reaction between the molten slag and the reducing agent. The controlled cooling is performed as a mixture gas including the steam and the carrier gas is blown into the molten slag.

Specifically, the steam supplying part 30 includes steam pipes 31, porous plugs 32 for steam and steam nozzles 33. The steam nozzles 33 are formed on the inner wall or the bottom of the slag reforming processing pot 10 such that the steam is injected through the steam nozzles 33. The porous plugs 32 for steam are provided between the steam nozzles 33 and the outer wall of the slag reforming processing pot 10.

Referring to the structure shown in FIG. 1, a plurality of the steam nozzles 33 which inject steam is provided on the inner wall and the bottom of the slag reforming processing pot 10, and the steam pipes 31 are connected to and communicate with the steam nozzles 33. Flow controllers 34 which control the amount and pressure of the steam to be injected are provided on the steam pipes 31. In addition, although not shown, each of the steam pipes 31 may have a discharge pipe through which condensed water produced due to the heat loss of the steam is discharged.

Figure 5:
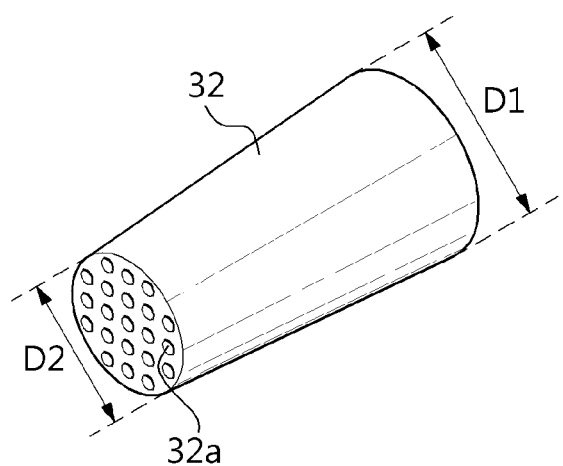
FIG. 5 is a perspective view showing the shape of the porous plug for steam shown in FIG. 1.

Here, the porous plugs 32 for steam are made of a porous refractory material, the major content of which can be an aluminum oxide or the like. As shown in FIG. 5, a plurality of holes 32a are irregularly arranged in each of the porous plugs 32. The holes 32a are irregularly formed not only in the surface of the porous plug 32 but also inside the porous plug 32. This structure allows gaseous or liquid steam transferred from the steam pipes 31 to efficiently pass through the holes 32a but prevents solid or large particles from being transferred.

Referring to FIG. 5, it is preferred that the outer diameter of the porous plug 32 for steam decreases gradually in the direction from the outer wall to the inner wall (D1>D2, as shown in FIG. 5). Accordingly, even if the pressure inside the slag reforming processing pot 10 is increased, the steam introduced into the slag reforming processing pot 10 can be prevented from flowing back toward the steam pipe 31.

Here, it is possible to introduce the steam into the slag reforming processing pot 10 using not only the above-described structure such as the porous plug but also a variety of inlet pipes or iron pipes.

In addition, a pressure controlling part 13 can be provided further. The pressure controlling part 13 prevents the steam or the carrier gas from flowing back to the outside of the slag reforming processing pot 10 by controlling the pressure at which the steam and the carrier gas is introduced into the slag reforming processing pot 10 based on the positive pressure of the molten slag detected inside the slag reforming processing pot 10.

The pressure controlling part 13 includes a sensor which detects the positive pressure of the molten slag inside the slag reforming processing pot 10 and a control section which controls the pressure at which the steam or the carrier gas is introduced into the slag reforming processing pot 10 based on the positive pressure.

Specifically, when the positive pressure of the molten slag inside the slag reforming processing pot 10 is increased, the steam or the carrier gas introduced into the slag reforming processing pot 10 may flow back toward the steam pipe 31 or the gas pipe 41. In this case, the pressure controlling part 13 automatically controls the pressure at which the steam and the carrier gas are introduced into the slag reforming processing pot 10 in order to prevent the steam or the carrier gas from flowing back.

For this, the positive pressure of the molten slag inside the lag reforming processing pot 10 is detected using a preset sensor. If the detected positive pressure is a preset pressure or greater, a preset control section of the pressure controlling part 13 increases the pressure at which the steam and the carrier gas are introduced so that the steam and the carrier gas can be efficiently introduced into the slag reforming processing pot 10 against the positive pressure.

In addition, the structure including the holes 32a in the porous plugs 32 for steam may not be used. Although not shown, a plurality of fine pipes made of one selected from among copper (Cu), iron (Fe) and stainless steel is connected to the steam pipes 31 such that the steam can be injected into the slag reforming processing pot 10 through the plurality of fine pipes.

The structure and function of the gas supplying part 40 are similar to those of the steam supplying part 30. The gas supplying part 40 includes gas pipes 41, porous plugs 42 for gas and gas nozzles 43. The gas nozzles 43 are formed on the inner wall or the bottom such that the carrier gas is injected through the gas nozzles 43. The porous plugs 42 for gas are provided between the gas nozzles 43 and the outer wall of the slag reforming processing pot 10. Here, the carrier gas may be implemented as air, nitrogen gas or argon gas.

A plurality of the gas nozzles 43 which injects the carrier gas into the slag reforming processing pot 10 is provided on the inner wall and the bottom of the slag reforming processing pot 10, and are connected to and communicate with the gas pipes 41. Flow controllers 44 which control the amount and pressure of the gas to be injected are provided on the gas pipes 31

Descriptions of the porous plugs 42 for gas will be omitted since the structure and function of the porous plugs 42 for gas are similar to those of the porous plugs 32 for steam.

As in the foregoing embodiment, when the steam and the carrier gas are respectively blown into the slag reforming processing pot 10 through the steam supplying part 30 and the gas supplying part 40, there is an advantage in that the flow rate and pressure at which the steam is blown and the flow rate and pressure at which the carrier gas is blown can be respectively controlled.

However, the present invention is not limited thereto. The steam pipes of the steam supplying part through which the steam is supplied into the slag reforming processing pot can be connected to the gas pipes of the gas supplying part through which the gas is supplied into the slag reforming processing pot such that a mixture gas containing the gas and the steam is supplied into the slag reforming processing pot under control.

In the meantime, when the mixture including the steam and the carrier gas is blown into the molten slag and the controlled cooling is performed, the molten slag, of which the specific weight and the melting point are lowered, is cooled in the state in which pores are formed inside the slag and thus is converted into the solid slag having a porous structure. It is then possible to easily crush the solid slag without large force.

If the molten slag is treated in a typical method, such as water cooling or air cooling, instead of the controlled cooling of the present invention, it is difficult to crush the slag due to a high Fe content. It is impossible to use the slag as a raw material for cement since it has a high specific weight of 3.5 g/cm$^3$ or greater and expansibility due to the phase transformation of f-CaO and f-MgO, which is problematic.

The solid slag having a porous structure that is manufactured by forming and controlled cooling after reduction has a bulk density ranging from 0.6 to 3.0. The bulk density indicates the density obtained by considering the volume (voids) between matters and is also referred to as apparent density.

When the bulk density is less than 0.6, an application as light aggregate for a building leads to an insignificant effect of preventing noise between floors. When the bulk density exceeds 3.0, it is difficult to use the slag as a raw material for cement.

The steam is blown in order to cool the slag, and the carrier gas is blown for the purpose of the stirring reaction between the molten slag and the reducing agent. The steam has excellent cooling efficiency since it lowers the temperature of the slag and expands little. For reference, water is not applied for cooling of the hot molten slag since it has a danger of explosion due to high expansibility.

The cooling can be performed up to room temperature at a cooling rate ranging from 1 to 50° C./sec. The cooling rate has maximum and minimum values depending on the amount at which the room-temperature carrier gas and the steam are blown and depending on the adjustment of pressure. The shape, strength and texture preciseness of the solid slag vary depending on the cooling rate.

Accordingly, the amount and pressure at which room-temperature gas and steam are blown are controlled such that the cooling rate stays in the range from 5 to 50° C./sec. This is intended to increase the efficiency of crushing the solid slag. When the cooling rate is 5° C./sec or greater, the average particle size of the slag is 50 mm or less, making the efficiency of crushing high. In addition, the upper limit of the cooling rate is obtained by applying the maximum value depending on the amount and the pressure at which the room-temperature carrier gas and the steam are supplied.

The apparatus 100 for recovering valuable metals and manufacturing multifunctional aggregate according to the present invention further includes a water cooling line 70 which prevents the slag reforming processing pot 10 from being thermally deformed.

Inside the slag reforming processing pot 10, thermal shock is repeatedly applied from the hot molten slag, and thus the slag reforming processing pot 10 may be thermally deformed. In order to prevent this, the water cooling line 70 is disposed around the outer wall of the slag reforming processing pot 10. It is possible to prevent the slag reforming processing pot 10 from being deformed by circulating room temperature water through the water cooling line 70.

Figure 6:
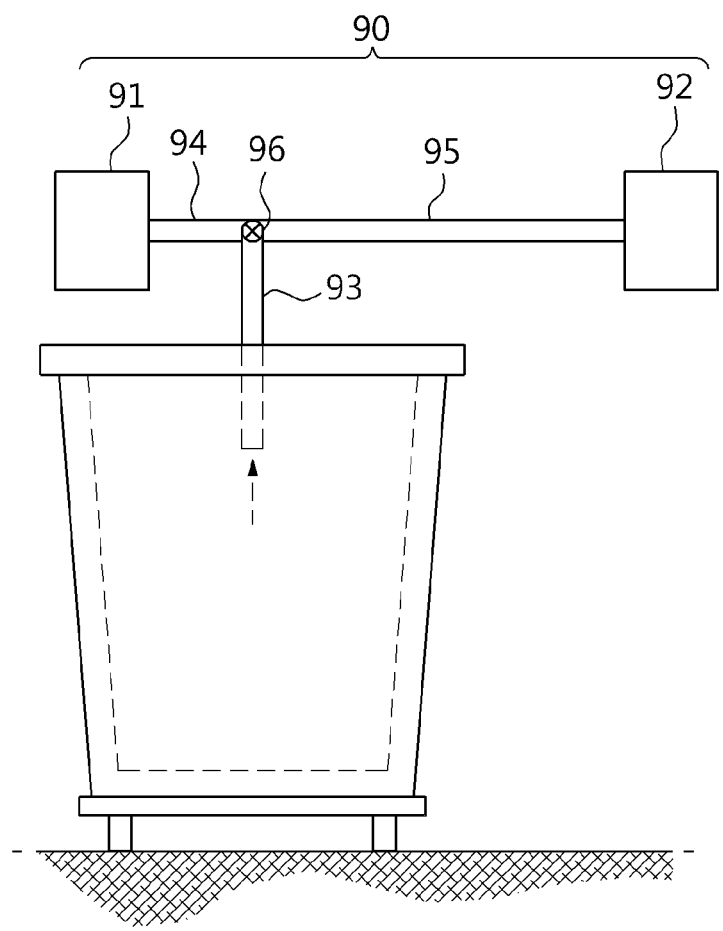
FIG. 6 is a configuration view showing an embodiment of a recovery unit of the apparatus for recovering valuable metals and manufacturing multifunctional aggregate shown in FIG. 1.

FIG. 6 is a configuration view showing an embodiment of a recovery unit of the apparatus for recovering valuable metals and manufacturing multifunctional aggregate shown in FIG. 1.

The apparatus 100 for recovering valuable metals and manufacturing multifunctional aggregate according to an embodiment of the present invention further includes the recovery unit 90 which recovers hot steam produced after the cooling of the molten slag inside the slag reforming processing pot 10, unreacted reducing agent powder inside the slag reforming processing pot, and dust produced from the reaction between the molten slag and the reducing agent.

Here, the recovery unit 90 includes a steam storing part 91, a dust recovering part 92, a common pipe 93, a steam pipe 94, a dust pipe 95 and a regulator 96. The steam storing part 91 and the dust recovering part 92 respectively recover and store hot steam and dust (including unreacted reducing agent powder).

Specifically, hot steam is produced after the molten slag is cooled inside the slag reforming processing pot 10, and is discharged to the outside of the slag reforming processing pot 10 through the common pipe 93. Likewise, when dust is produced from the reaction between the molten slag and the reducing agent, the dust is discharged to the outside of the slag reforming processing pot 10 through the common dust 93.

Referring to FIG. 6, the steam and the dust introduced into the common pipe 93 are respectively guided to the steam storing part 91 and the dust recovering part 92.

Describing in detail, the hot steam is produced when the molten slag is cooled, and the dust is produced from the reaction between the molten slag and the reducing agent. The point of time when the steam is produced differs from the point of time when the dust is produced.

Describing depending on the respective points of time, at the time of reaction between the molten slag and the reducing agent, the regulator 96 is adjusted so that the dust that has passed through the common pipe 93 is guided to the dust recovering part 92. The dust is collected by being guided to the dust pipe 95 in this fashion.

In addition, when the molten slag is cooled under control, the regulator 96 is adjusted so that the steam that has passed through the common pipe 93 is guided to the steam recovering part 91. In this fashion, the hot steam is collected by being guided to the steam pipe 94. Here, the regulator 96 can be implemented as a directional valve such as a solenoid valve.

That is, the recovery unit 90 can selectively recover the hot steam produced after the cooling of the molten slag inside the slag reforming processing pot 10 or the dust produced from the reaction between the molten slag and the reducing agent using the regulator 96.

In this fashion, efficiency can be improved by recovering and recycling the hot steam that has been guided to the steam storing part 91. It is also possible to prevent pollutants from being discharged by collecting the dust that has been guided to the dust recovering part 92.

Figure 7:
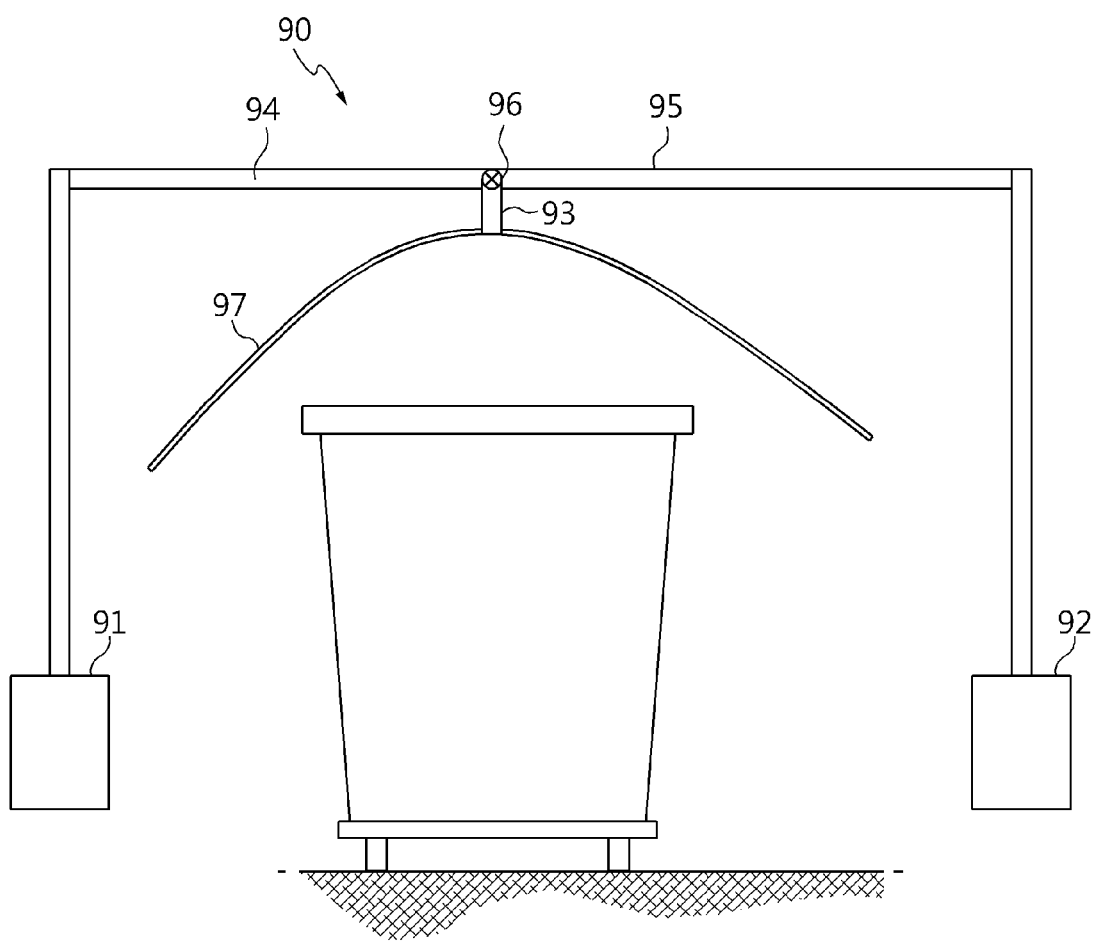
FIG. 7 is a configuration view showing another embodiment of the recovery unit of the apparatus for recovering valuable metals and manufacturing multifunctional aggregate shown in FIG. 1.

FIG. 7 is a configuration view showing another embodiment of the recovery unit of the apparatus for recovering valuable metals and manufacturing multifunctional aggregate shown in FIG. 1.

The recovery unit 90 shown in FIG. 7 can include a dust collecting hood 97 which is spaced apart from the upper portion of the slag reforming processing pot 10 and traps the steam and the dust by suction.

Accordingly, the steam or dust discharged above the slag reforming processing pot 10 can be collected by the dust collecting hood 97, be discharged through the common pipe 93, and be guided to and stored in the steam storing part 91 or the dust recovering part 92.

Figure 8:
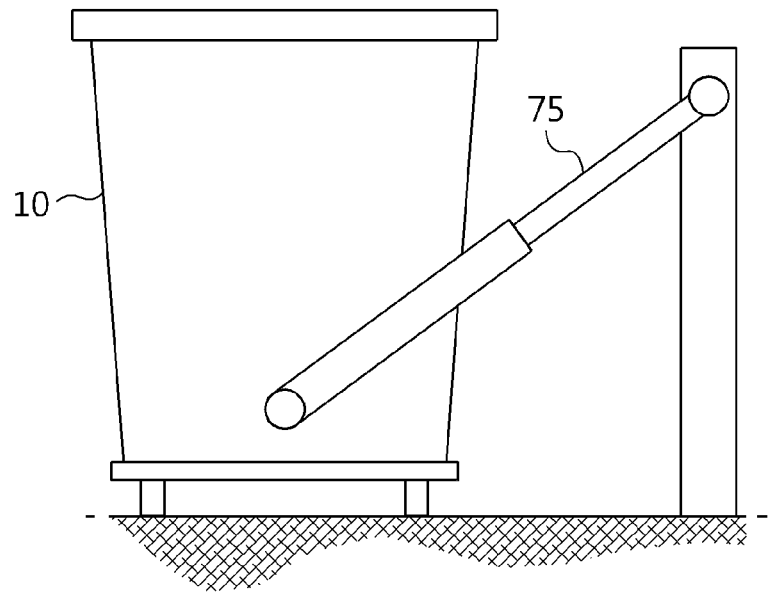
FIG. 8 is a view showing a tilting unit of the apparatus for recovering valuable metals and manufacturing multifunctional aggregate shown in FIG. 1.

FIG. 8 is a view showing a tilting unit of the apparatus for recovering valuable metals and manufacturing multifunctional aggregate shown in FIG. 1

The apparatus 100 for recovering valuable metals and manufacturing multifunctional aggregate according to the present invention further includes the tilting unit 75 which tilts the slag reforming processing pot 10 in order to discharge the solid slag, the controlled cooling of which has been completed inside the slag reforming processing pot 10, to the outside.

When the molten slag is converted into the solid slag having a porous structure through the controlled cooling, the solid slag is discharged to the outside in order to be crushed and ground.

Referring to FIG. 8, the tilting unit 75 is hinge-coupled to the side of the slag reforming processing pot 10, and discharges the solid slag to the outside by tilting the slag reforming processing pot 10 using power supplied from a force source (not shown).

Although FIG. 8 shows that the tilting unit 75 is fixed to the side of the slag reforming processing pot 10 to tilt the slag reforming processing pot 10, the position when the tilting unit 75 is disposed is not limited. It is also possible to fix the tilting unit 75 to the lower portion of the slag reforming processing pot 10 and thus move the slag reforming processing pot 10 in the top-bottom direction.

In addition, although FIG. 8 shows the embodiment in which the tilting unit 75 is implemented as a hydraulic tilting unit which tilts the slag reforming processing pot 10 using a hydraulic cylinder which receives hydraulic pressure from a hydraulic source (not shown), the tilting unit can also be implemented as a motor which uses electricity as power in place of hydraulic pressure.

Figure 9:
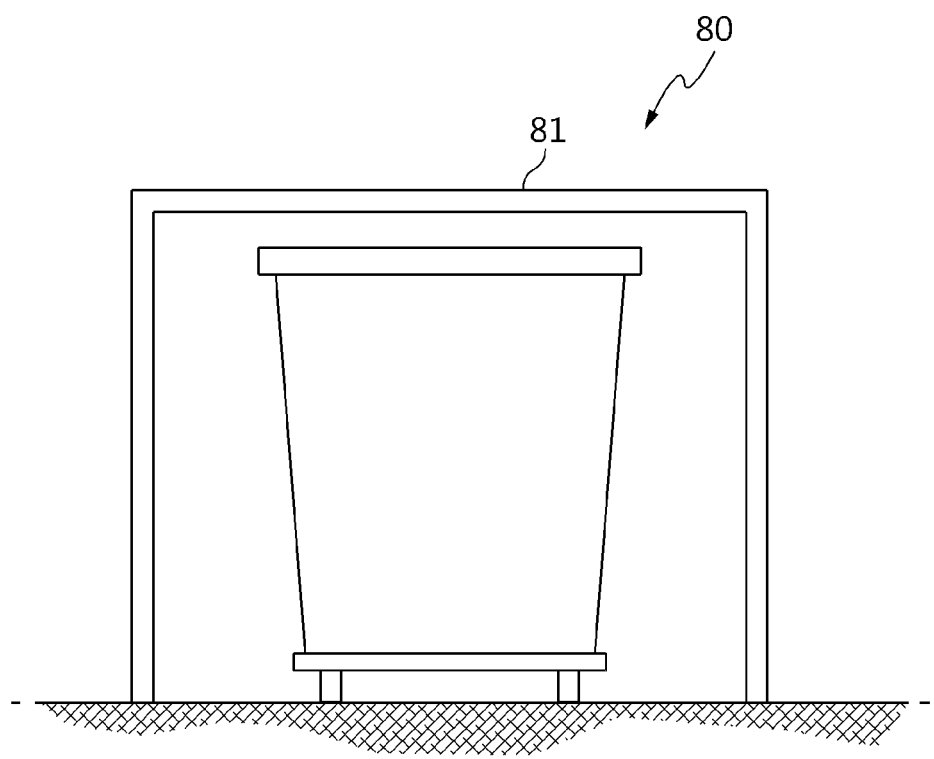
FIG. 9 is a configuration view showing a first embodiment of a weld preventing part of the apparatus for recovering valuable metals and manufacturing multifunctional aggregate shown in FIG. 1.
Figure 10:
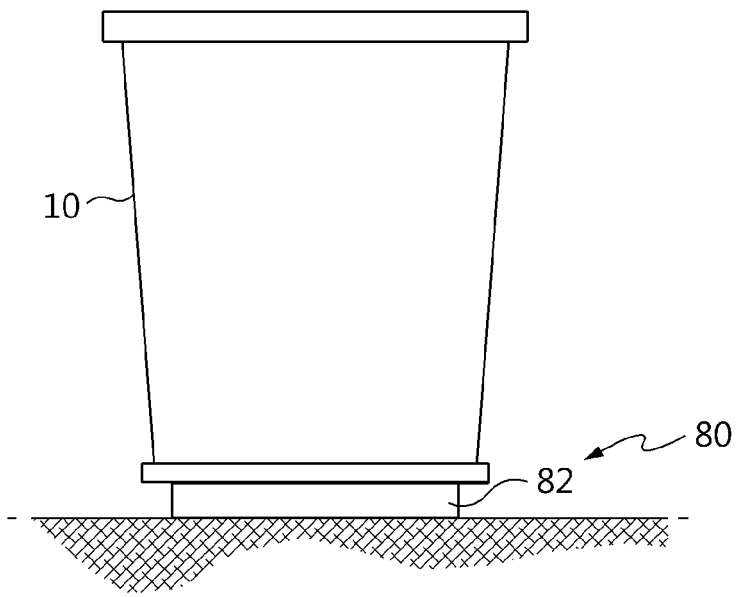
FIG. 10 is a configuration view showing a second embodiment of the weld preventing part of the apparatus for recovering valuable metals and manufacturing multifunctional aggregate shown in FIG. 1.
Figure 11:
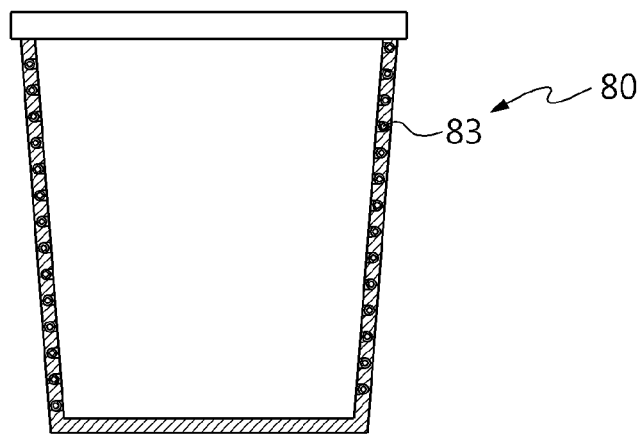
FIG. 11 is a configuration view showing a third embodiment of the weld preventing part of the apparatus for recovering valuable metals and manufacturing multifunctional aggregate shown in FIG. 1.

FIG. 9 is a configuration view showing a first embodiment of a weld preventing part of the apparatus for recovering valuable metals and manufacturing multifunctional aggregate shown in FIG. 1, FIG. 10 is a configuration view showing a second embodiment of the weld preventing part of the apparatus for recovering valuable metals and manufacturing multifunctional aggregate shown in FIG. 1, and FIG. 11 is a configuration view showing a third embodiment of the weld preventing part of the apparatus for recovering valuable metals and manufacturing multifunctional aggregate shown in FIG. 1.

The apparatus 100 for recovering valuable metals and manufacturing multifunctional aggregate according to the present invention further includes the weld preventing part 80 which is provided outside the slag reforming processing pot 10 in order to prevent the solid slag, the controlled cooling of which has been completed inside the slag reforming processing pot 10, from being welded to the inner wall of the slag reforming processing pot 10.

While the controlled cooling is being performed inside the slag reforming processing pot 10, the molten slag may be welded to the inner wall of the slag reforming processing pot 10. In this case, even if the slag reforming processing pot 10 is tilted using the tilting unit 75, the slag welded to the inner wall is not discharged to the outside of the slag reforming processing pot 10, which is problematic. Accordingly, the weld preventing part 80 which prevents the solid slag, the controlled cooling of which has been completed, from being welded to the inner wall of the slag reforming processing pot 10 is employed.

Referring to FIG. 9, the weld preventing part 80 may be implemented as a high-frequency heater 81 which radiates high-frequency waves to the slag reforming processing pot 10 from the outside of the slag reforming processing pot 10. High-frequency heating (high-frequency induction heating) used in heating metals is enabled by electromagnetic induction using a high-frequency current. The outer wall of the slag reforming processing pot 10 is heated using high-frequency waves, and the heat transmitted to the inner wall temporarily heats the slag on the inner wall of the slag reforming processing pot 10, thereby preventing welding.

As an alternative, referring to FIG. 10, the weld preventing part 80 may be implemented as a vibrator 82 which is disposed under the slag reforming processing pot 10 in order to transmit minute vibration to the slag reforming processing pot 10. In addition, referring to FIG. 11, the weld preventing part 80 may be implemented as hot wires 83 which are buried between the outer wall and the inner wall of the slag reforming processing pot 10 in order to heat the slag reforming processing pot 10 between the outer wall and the inner wall.

When the molten slag is converted into the solid slag having a porous structure through the controlled cooling, the solid slag is discharged to the outside using the tilting unit 75, and then is crushed and ground.

The solid slag having a porous structure is easy to crush and grind since the content of Fe, a valuable metal, is low, and the solid slag has a porous structure. The crushed and ground solid slag has a uniform average particle size of 50 mm or less.

Figure 12:
FIG. 12 is a view showing applications of multifunctional aggregate.

FIG. 12 is a view showing applications of multifunctional aggregate.

The multifunctional aggregate manufactured as above contains $CaO$, $Al_2O_3$ and $SiO_2$ as main ingredients, and is applicable as shown in FIG. 12. This consequently reduces not only the amount of fuel used for manufacturing cement but also power consumption.

In addition, cement produced using the multifunctional aggregate does not require calcination unlike the manufacture of conventional cement. Accordingly, the amount of carbon dioxide emission is reduced by about 40%.

In addition, the multifunctional aggregate exhibits superior chemical resistance and superior resistance to the penetration of chloride ions. In addition, the multifunctional aggregate can reduce alkali silica reaction (ASR) and thus can be used for a concrete structure having high endurance.

The above-described method and apparatus can be equally applied to slag discharged from a converter.

The scope of the present invention is not limited to the foregoing exemplary embodiments but is defined by the disclosure of the claims. A person skilled in the art will appreciate that various modifications and changes are possible without departing from the scope of the present invention as disclosed in the claims.

What is claimed is:

1. An apparatus for recovering valuable metals and manufacturing multifunctional aggregate from slag, comprising:
    a slag reforming processing pot in which molten slag discharged from a converter or an electric furnace is stored;
    a reducing agent introducing part that introduces a reducing agent into the slag reforming processing pot, wherein the reducing agent recovers valuable metals from a molten slag;
    a reducing agent inflow part that inputs the reducing agent into the slag reforming processing pot via a lower portion of a side of the slag reforming processing pot, wherein the reducing agent recovers valuable metals from the molten slag; and
    a cooling unit configured to create bubbles and cool the molten slag to convert the molten slag into a material having a porous structure,
    wherein the reducing agent inflow part includes:
        an injection pipe disposed at the lower portion of the side of the slag reforming processing pot and configured to introduce the reducing agent and a gas into the slag reforming processing pot;
        a supply pipe connected to one portion of the injection pipe and configured to supply the reducing agent and the gas to the injection pipe; and
        an aperture opener disposed in the injection pipe and configured to open an outlet of the injection pipe when the outlet is closed.

2. The apparatus according to claim 1, wherein the reducing agent introducing part includes:
    a hopper in which the reducing agent is stored;
    a lance pipe that extends from the hopper into the slag reforming processing pot to inject the reducing agent into the slag reforming processing pot; and
    an inflow controller configured to calculate an amount of the reducing agent introduced into the slag reforming processing pot via the lance pipe.

3. The apparatus according to claim 1, wherein the aperture opener includes:
    a body disposed at one end of the injection pipe that is opposite the outlet, wherein the body includes a space through which hydraulic or pneumatic pressure enters and exits; and
    an aperture opening part that opens and closes inside the body in a direction toward the outlet of the injection pipe, wherein a part of the outer circumference of the leading end of the aperture opening part corresponds to an inner diameter of the injection pipe.

4. The apparatus according to claim 3, wherein the aperture opening part has a conical leading end.

5. The apparatus according to claim 1, further comprising:
a reducing agent sensor configured to detect a closure of the outlet of the injection pipe based on whether the reducing agent flows inside the injection pipe; and
an opener controller configured to receive a detection signal from the reducing agent sensor and open the outlet of the injection pipe by operating the aperture opener in response to determining the closure of the outlet of the injection pipe.

6. The apparatus according to claim 1, wherein the supply pipe is connected to a reducing agent supply pipe connected to the hopper and a gas supply pipe, wherein the supplied reducing agent and the gas are mixed before being supplied to the injection pipe.

7. The apparatus according to claim 6, wherein the reducing agent supply pipe and the gas supply pipe include injection valves configured to adjust amounts of the supplied reducing agent and the supplied gas.

8. The apparatus according to claim 1, wherein the cooling unit includes:
a steam supplying part configured to introduce steam into the slag reforming processing pot, wherein the steam cools the molten slag to produce the solid slag; and
a gas supplying part configured to introduce a carrier gas into the slag reforming processing pot, wherein the carrier gas increases a reaction between the molten slag and the reducing agent,
wherein the cooling is performed as a mixture gas that includes the steam and the carrier gas which is blown into the molten slag.

* * * * *